United States Patent
Au et al.

(10) Patent No.: US 10,405,300 B2
(45) Date of Patent: Sep. 3, 2019

(54) SIGNALING AND CONTROL CHANNEL STRUCTURES FOR MULTIPLE SERVICES

(71) Applicants: Kelvin Kar Kin Au, Kanata (CA); Jianglei Ma, Ottawa (CA)

(72) Inventors: Kelvin Kar Kin Au, Kanata (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 389 days.

(21) Appl. No.: 15/015,649

(22) Filed: Feb. 4, 2016

(65) Prior Publication Data

US 2017/0230954 A1 Aug. 10, 2017

(51) Int. Cl.
*H04W 72/04* (2009.01)
*H04W 4/70* (2018.01)
(Continued)

(52) U.S. Cl.
CPC ........... *H04W 72/0406* (2013.01); *H04L 1/00* (2013.01); *H04L 5/005* (2013.01); *H04L 5/0044* (2013.01);
(Continued)

(58) Field of Classification Search
CPC .............. H04W 72/0406; H04W 4/70; H04W 72/0453; H04L 5/0094; H04L 5/0092;
(Continued)

(56) References Cited

U.S. PATENT DOCUMENTS

| 2014/0016570 A1 | 1/2014 | Ma et al. |
| 2015/0334708 A1 | 11/2015 | Lee et al. |

(Continued)

FOREIGN PATENT DOCUMENTS

| EP | 3306996 A1 | 4/2018 |
| WO | 2013049768 A1 | 4/2013 |

(Continued)

OTHER PUBLICATIONS

3rd Generation Partnership Project; Technical Specification Group Radio Access Network; Evolved Universal Terrestrial Radio Access (E-UTRA); Physical channels and modulation (Release 13), 3GPP TS 36.211 V13.0.0 (Dec. 2015), 650 Route des Lucioles—Sophia Antipolis Valbonne—France, pp. 1-141.

(Continued)

*Primary Examiner* — Thai Nguyen

(57) ABSTRACT

Methods and systems are provided to allow signals for multiple service slices using sub-bands that are part of a system bandwidth. In some cases the signals for a given service slice are self-contained within the sub-band in the sense that channels for initial access and ongoing communications are all located within the sub-band. A receiver that is only accessing the given service slice need only be capable of receiving the sub-band. The method may involve transmitting, in a first logical frequency resource, first data and first signaling information associated with the first data, the first signaling information including initial access information associated with the first data, and transmitting, in a second logical frequency resource, second signaling information associated with second data.

30 Claims, 8 Drawing Sheets

(51) Int. Cl.
*H04L 1/00* (2006.01)
*H04L 5/00* (2006.01)
*H04L 27/26* (2006.01)
*H04L 1/16* (2006.01)

(52) U.S. Cl.
CPC .......... *H04L 5/0053* (2013.01); *H04L 5/0064* (2013.01); *H04L 5/0092* (2013.01); *H04L 5/0094* (2013.01); *H04L 27/2602* (2013.01); *H04W 4/70* (2018.02); *H04W 72/0453* (2013.01); *H04L 1/0079* (2013.01); *H04L 1/1671* (2013.01); *H04L 5/0007* (2013.01); *H04L 5/0087* (2013.01)

(58) Field of Classification Search
CPC ... H04L 5/0064; H04L 5/005; H04L 27/2602; H04L 5/0053; H04L 5/0044; H04L 1/00; H04L 5/0087; H04L 1/1671; H04L 1/0079; H04L 5/0007
See application file for complete search history.

(56) References Cited

U.S. PATENT DOCUMENTS

| 2016/0143017 | A1 | 5/2016 | Yang et al. |
| 2016/0352551 | A1 | 12/2016 | Ma et al. |
| 2017/0079059 | A1* | 3/2017 | Li .......................... H04W 16/02 |
| 2017/0156140 | A1 | 6/2017 | Islam et al. |
| 2017/0215170 | A1 | 7/2017 | Islam et al. |

FOREIGN PATENT DOCUMENTS

| WO | 2013169470 A1 | 11/2013 | |
| WO | 2015012666 A1 | 1/2015 | |
| WO | 2016004634 A1 | 1/2016 | |
| WO | WO 2017123045 A1 * | 7/2017 | ............... H04L 5/00 |

OTHER PUBLICATIONS

Presentation of Specification/Report to TSG: TR 36.802, Version 1.0.0, RP-160973, 3GPP TSG-RAN Meeting #72,3rd Generation Partnership Project; Technical Specification Group Radio Access Networks; Narrowband Internet of Things (NB-IoT); Technical Report for BS and UE radio transmission and reception (Release 13) Busan, Korea, Jun. 13-16, 2016.

Hoymann, et al. "A Lean Carrier for LTE", LTE Technology Update: Part 2, IEEE Communications Magazine • Feb. 2013, pp. 74-80.

Huawei, HiSilicon, "Discussion on bandwidth reduction and other issues for low cost MTC UEs", 3GPP TSG RAN WG1 Meeting #74bis, R1-134051, Gangzhou, China, Oct. 7-11, 2013, 5 pages.

* cited by examiner

SIGNALING AND CONTROL CHANNEL STRUCTURES FOR MULTIPLE SERVICES

FIELD

The application relates to signaling and control channel structures for multiple services.

BACKGROUND

Multiple services that are available within a single network may have dramatically different bandwidth requirements. Examples include machine type communications (MTC) which have a relatively small bandwidth requirement within an overall system bandwidth and enhanced Mobile Broadband (eMBB) which has a relatively large bandwidth requirement within the system bandwidth.

There is a general need for efficient bandwidth usage. In addition, it would be desirable for MTC devices to be as low-cost as possible. Current Long Term Evolution (LTE) systems consist of signaling and control channel structures in which different services are supported with the same signaling and control channel structures in the same bandwidth. Introducing a new service can only be supported by the same structure, which may not be sufficiently flexible to accommodate the different bandwidth and coverage requirements of the new service.

SUMMARY

According to one aspect of the present invention, there is provided a method comprising: transmitting, in a first logical frequency resource, first data and first signaling information associated with the first data, the first signaling information including initial access information associated with the first data; and transmitting, in a second logical frequency resource, second signaling information associated with second data.

According to another aspect of the present invention, there is provided a method in a user equipment comprising: performing initial system access using a first frequency sub-band; receiving an assignment of resources to use for ongoing communications in a second sub-band; and performing ongoing communications using the second sub-band, including subsequent access.

According to a further aspect of the present invention, there is provided an apparatus comprising: a first transmitter configured to transmit, in a first logical frequency resource, first data and first signaling information associated with the first data, the first signaling information including initial access information associated with the first data; and a second transmitter configured to transmit, in a second logical frequency resource, second signaling information associated with second data.

According to still another aspect of the present invention, there is provided an apparatus comprising: a transmitter configured to provide a first service by transmitting, in a first logical frequency resource, first data and first signaling information associated with the first data, the first signaling information including initial access information associated with the first data; and the transmitter further configured to transmit, in a second logical frequency resource, second signaling information associated with second data.

BRIEF DESCRIPTION OF THE DRAWINGS

Embodiments of the disclosure will now be described with reference to the attached drawings in which.

DETAILED DESCRIPTION

A Software Configurable Air Interface (SoftAI) has been proposed to address diverse services and device capabilities. See for example US publication no. US20140016570 entitled "System and Method for Dynamically Configurable Air Interface", hereby incorporated by reference in its entirety. A default frame structure may be defined to facilitate user equipment (UE) initial access and to instruct a UE to use frame structure configurations in other sub-bands. A default frame structure may be used for initial access to various services, and need not be service-specific. In such a situation, the UE would need to be able to receive both the sub-band containing the default frame structure, and the sub-band containing the instructed frame structure.

It would be desirable for MTC devices to be low cost devices, which may require that these devices only support narrowband transmission and reception. For a very wide system bandwidth (e.g. 100 MHz), it may not be feasible to make a low cost MTC device that supports simultaneously multiple sub-bands for default frame structure (for control signaling) and machine type communications (for data exchange).

In some embodiments, a system bandwidth is configured with a respective sub-band for each service. For at least one of the services, a self-contained set of signaling and data channels can be defined within the configured sub-band such that a UE obtaining that service need only monitor the configured sub-band instead of the entire system bandwidth.

Figure 1:
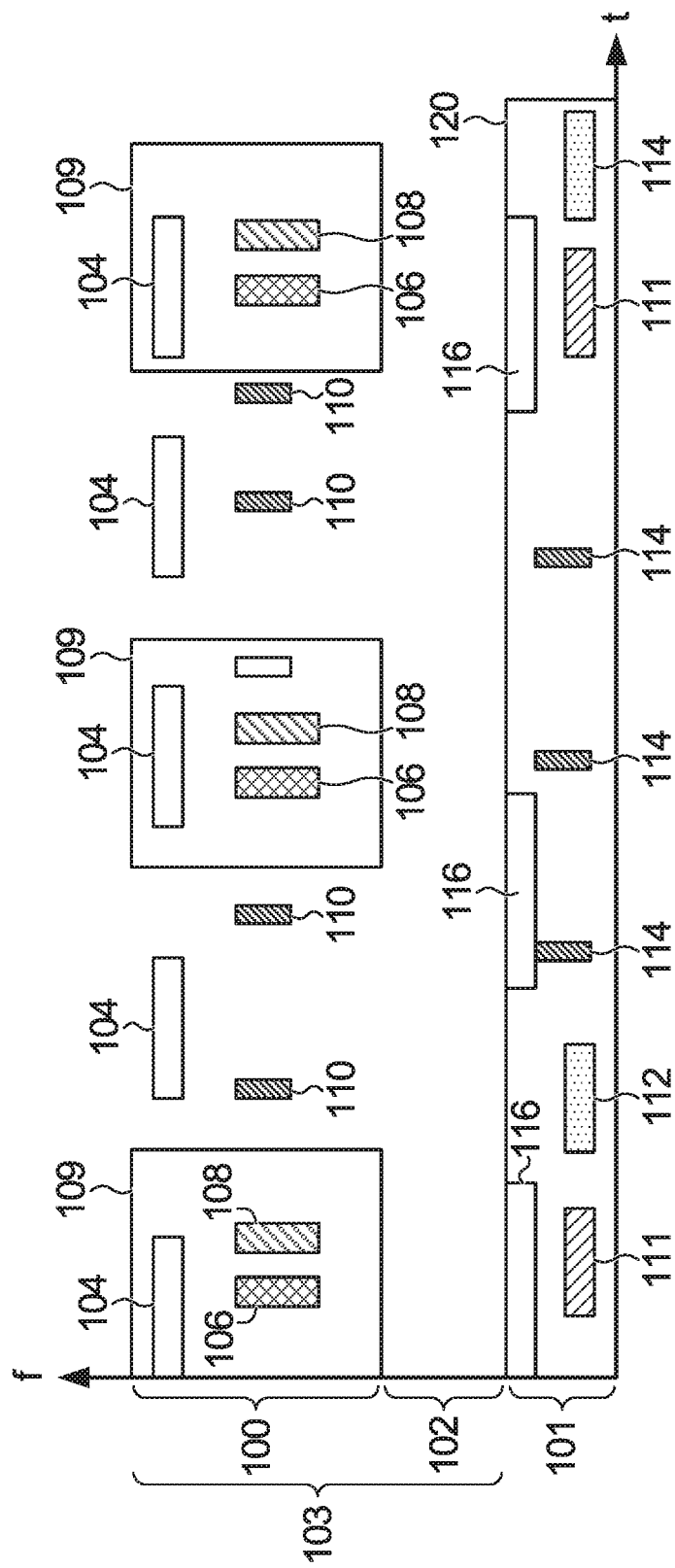
FIG. 1 is an example of a time frequency resource allocation diagram showing allocation of resources for multiple services.

Referring now to FIG. 1, shown is a first example in which a system bandwidth, which might for example be 20 MHz or wider, is divided into a first sub-band 100 and a second sub-band 101. The system bandwidth is a bandwidth associated with a system operating on a same carrier frequency. There may be a larger number of sub-bands. Differing numerologies and/or channelizations may be employed within the two sub-bands See for example commonly assigned U.S. provisional application No. 62/169,342 to Liqing Zhang et al., entitled "System and Scheme of Scalable OFDM Numerology", U.S. application Ser. No. 14/942,983 entitled "Resource Block Channelization for OFDM-based numerologies", and U.S. application Ser. No. 15/006,772 entitled "System and Method for Bandwidth Division and Resource Block Allocation", all of which are hereby incorporate by reference in their entirety.

A respective service slice is implemented within each sub-band 100,101. For the purpose of this example, an eMBB service is implemented within sub-band 100, and an MTC service is implemented within sub-band 101, but more generally, in some embodiments, two or more different services are provided within two or more corresponding sub-bands. The sub-band location, frame structure configuration, and bandwidth can be predefined for each service slice. In the illustrated example, the transmission resources are for downlink transmissions. More generally, the methods and systems described herein can be applied to downlink, or uplink, or both downlink and uplink depending on the application. Downlink transmissions on multiple sub-bands, such as sub-band 100 and sub-band 101, may be from the same or different network elements.

The first sub-band 100 is allocated for an air interface configuration including transmission resources for data, and signalling information associated with the data. In the illustrated example, the data and signalling information are associated with a first service, which may be eMBB. A default frame structure 109 for initial access is defined within sub-band 100.

The default frame structure 109 includes a default synchronization channel 106, and a default broadcast channel 108. The default frame structure repeats on an ongoing basis, for example every 10 ms. More generally, a default structure with differently allocated resources and/or periodicity may be provided. The default frame structure may also include a random access channel (not shown). Channels that are needed for initial access are included in the default frame structure. In the illustrated example, these include the default synchronization channel 106 for obtaining the timing of the orthogonal frequency division multiplexing (OFDM) symbols and frame, and the default broadcast channel 108 carrying basic system information. Remaining space within the default frame structure can be used to carry data.

Other channels that are not necessary for initial access may not need to be inside the default frame structure 109. In the illustrated example, such additional channels include a control channel for eMBB 104 which may be partly inside the default frame structure 109 and partly outside the default frame structure 109; and an acknowledgement/negative acknowledgement (ACK/NACK) channel 110.

In operation, with the default frame structure 109, initial access for eMBB service can be performed using the channels provided by the default frame structure. The default frame structure can also be used to inform the UE of what resources to use for ongoing communications. For eMBB, this would involve allocating resources within sub-band 100.

The second sub-band 101 is allocated for an air interface configuration including transmission resources for data, and signalling information for MTC. Shown is a frame structure 120 that includes resources for initial access including an MTC synchronization channel 111 and an MTC broadcast channel 112. Synchronization for MTC might be performed every 100 ms, for example. The frame structure 120 also includes other resources for ongoing communication including an MTC ACK/NACK channel 114, and MTC control channel 116. In some embodiments, sub-band 101 is located at the edge of a given system bandwidth.

Within sub-band 101, the MTC synchronization channel 111 and the broadcast channel 112 may be defined in accordance with an MTC frame structure, different from the default frame structure 109. Channels 111 and 112 may have a different periodicity and/or different resource mapping (e.g. mapped over time) than channels 106 and 108. For example, the MTC synchronization channel 111 may have a longer periodicity than the default synchronization channel 106 due to low mobility of MTC devices. The MTC broadcast channel 112 may have longer periodicity than the default broadcast channel 108 due to less change in system information. In operation, MTC UEs tune to the pre-defined MTC frame structure configuration for synchronization and system information.

In the example, above, a different service is implemented within each of sub-bands 100,101. In another embodiment, the same service is implemented within each of two or more sub-bands, each of which contains all the resources necessary for end to end communications in that sub-band, including both those necessary for initial access and those necessary for ongoing communications. In a specific embodiment, an MTC service is provided within each of two sub-bands which may be contiguous or not. This would be suitable in a situation where there is a large amount of MTC traffic that might not fit within a single sub-band. By providing two sub-bands that each provide resources for both initial access and ongoing communication, a UE will not need to rely on out-of-band control channel for initial access. In some embodiments, where there are two sub-bands that provide a given service, for example MTC, the sub-band assigned to a given UE may be predefined. Another example will now be described again with reference to FIG. 1. In this example, a system bandwidth is divided into sub-band 101 for a first service which is the same as described in the previous example, and sub-band 103 for a second service. Sub-band 103 is further subdivided into sub-band 100 which is the same as described in the previous example, and another sub-band 102. The two sub-bands 100,102 might, for example, be used to support two differing numerologies for the same service, for example eMBB. In another example, the two sub-bands 100, 102 might be used to support two differing numerology options for two different services, for example eMBB and broadcast services. The two sub-bands 100,102 can share common control channels. For example, control channel 104 can be used to provide control information such as resource assignment for sub-bands 100 and 102. In some embodiments, where multiple sub-bands are provided for a single service, such as sub-band 100 and 102, a default frame structure can be used to inform the user of what resources to use for ongoing communications within the multiple sub-bands provided for the service. For example, a UE that performs initial access using the default frame structure 109 on sub-band 100 can be informed of, and instructed to use, resources within sub-band 100 or sub-band 102 for on-going communications. Note that the UE in this scenario needs to be able to receive and decode sub-band 103. In some embodiments, where a UE is instructed to use a different sub-band for ongoing communications than was used for initial access, the UE also uses the different sub-band for subsequent access. In some embodiments, the size of sub-bands 100, 101, 102 can be adjusted by the network over time. The adjustment can be based on the available bandwidth of the system, traffic loading of different services on the different sub-bands and/or the number of UEs supported on the different sub-bands. In addition, the signaling and control channel structures may differ in the case of varying the sub-band bandwidth.

In some embodiments, channel structures are implemented to support different coverage requirements of different services. For example, eMBB control channels may have different coverage requirements than MTC control channels. For example, MTC control channels may need to reach devices in basements, and may not have to accommodate device mobility.

Each UE is responsible for processing received signals within a specific sub-band. From the network perspective, the sub-bands are not necessarily dedicated to the specific services. Resources that are left over after all the required channels are accounted for can be allocated to other purposes.

Figure 2A:
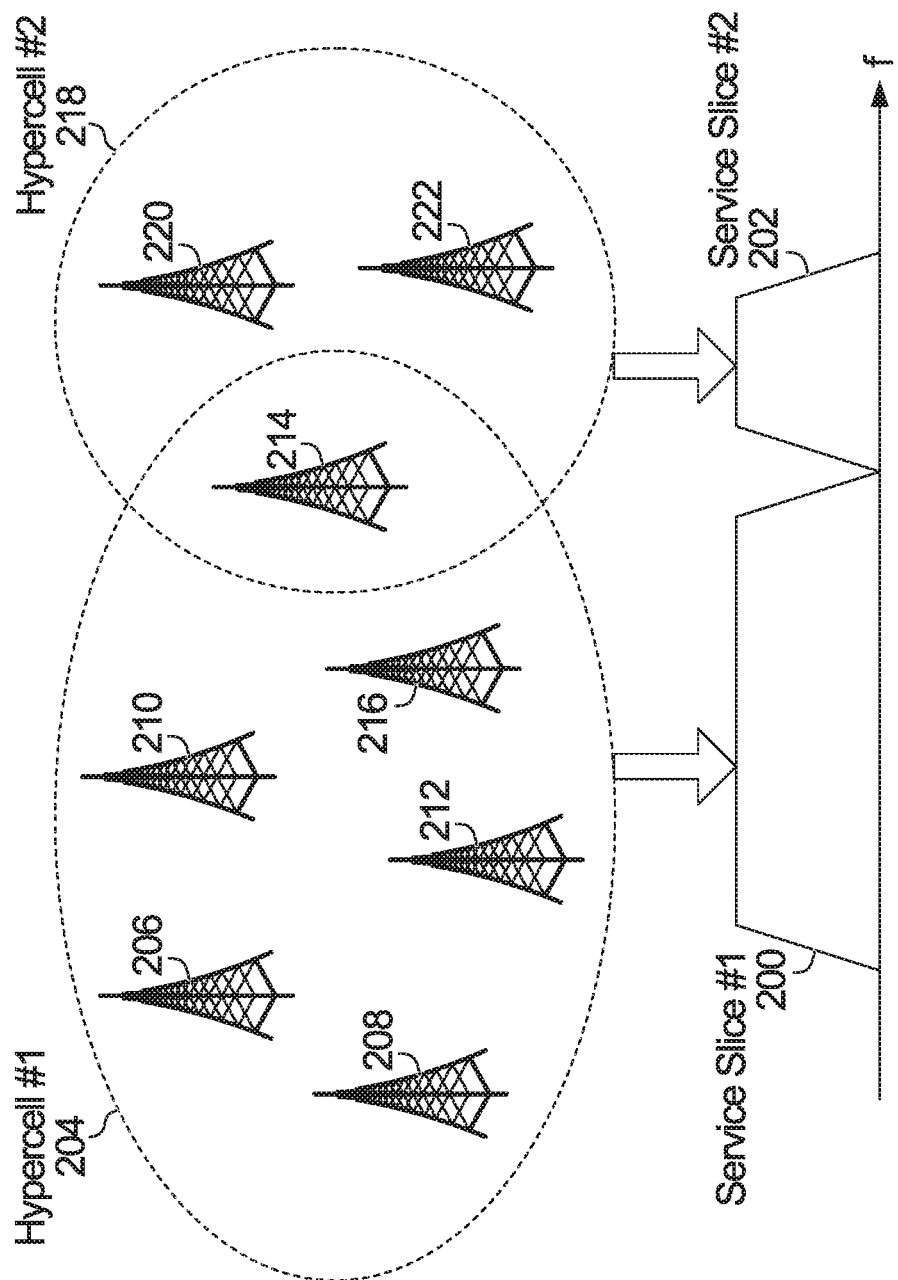
FIG. 2A is a system diagram showing different hypercell IDs for different services.
Figure 2B:
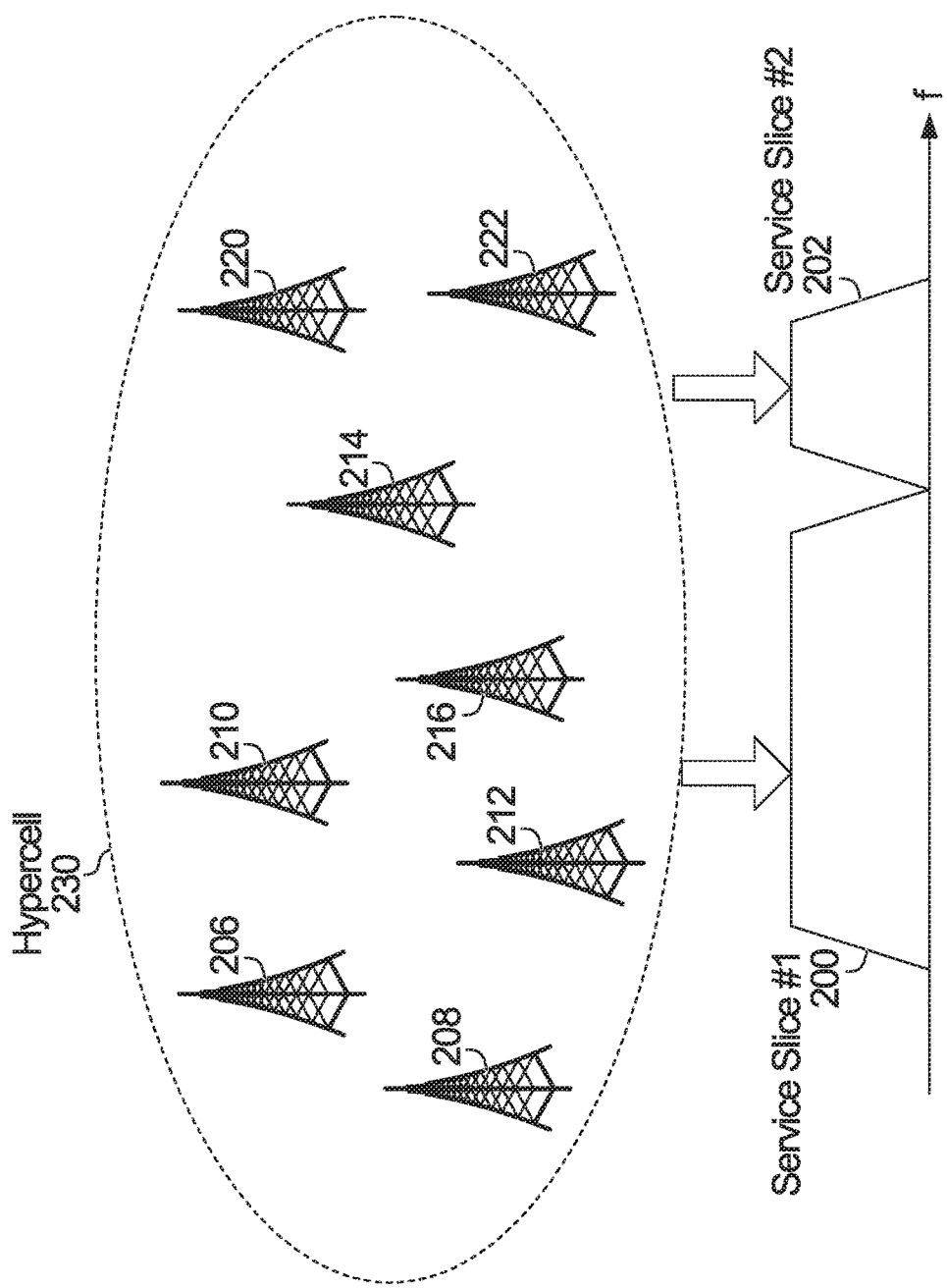
FIG. 2B is a system diagram showing a single hypercell ID providing different services.

In some embodiments, the data and control channels of different services may be covered by different hypercell IDs. An example is depicted in FIG. 2A, where a system bandwidth is divided into a first sub-band 200 for a first service slice (Service Slice #1), for example eMBB, and a second sub-band 202 for a second service slice (Service Slice #2), for example MTC. A first hypercell (Hypercell #1, more generally a first logical entity) 204 is composed of network elements 206,208,210,212,214,216 operating on the first service slice, and a second hypercell (Hypercell #2, more generally a second logical entity) 218 is composed of network elements 214,220,222 operating on the second service slice. A network element can be a base station, an access point or a remote radio head (RRH) connected to a network controller, for example. It can be seen that network element 214 is operating on both service slices. In this case, the transmitter of network element 214 transmits signaling information for both Service Slice #1 200 and Service Slice #2 202. Network elements 206, 208, 210, 212, 216 transmit signaling information for Service Slice #1 200. Network elements 220, 222 transmit signaling information for Service Slice #2 202. FIG. 2B depicts another example in which Service Slice#1 and Service Slice#2 are both provided by a single Hypercell 230.

In some embodiments, a logical to physical frequency partition mapping is configurable based on service scenarios and device capabilities. For example, a first service such as a low cost MTC service may have a direct logical to physical mapping within a physically confined sub-band, and a second service such as eMBB may use a hopping pattern to map logic resources to physical resources.

Figure 3A:
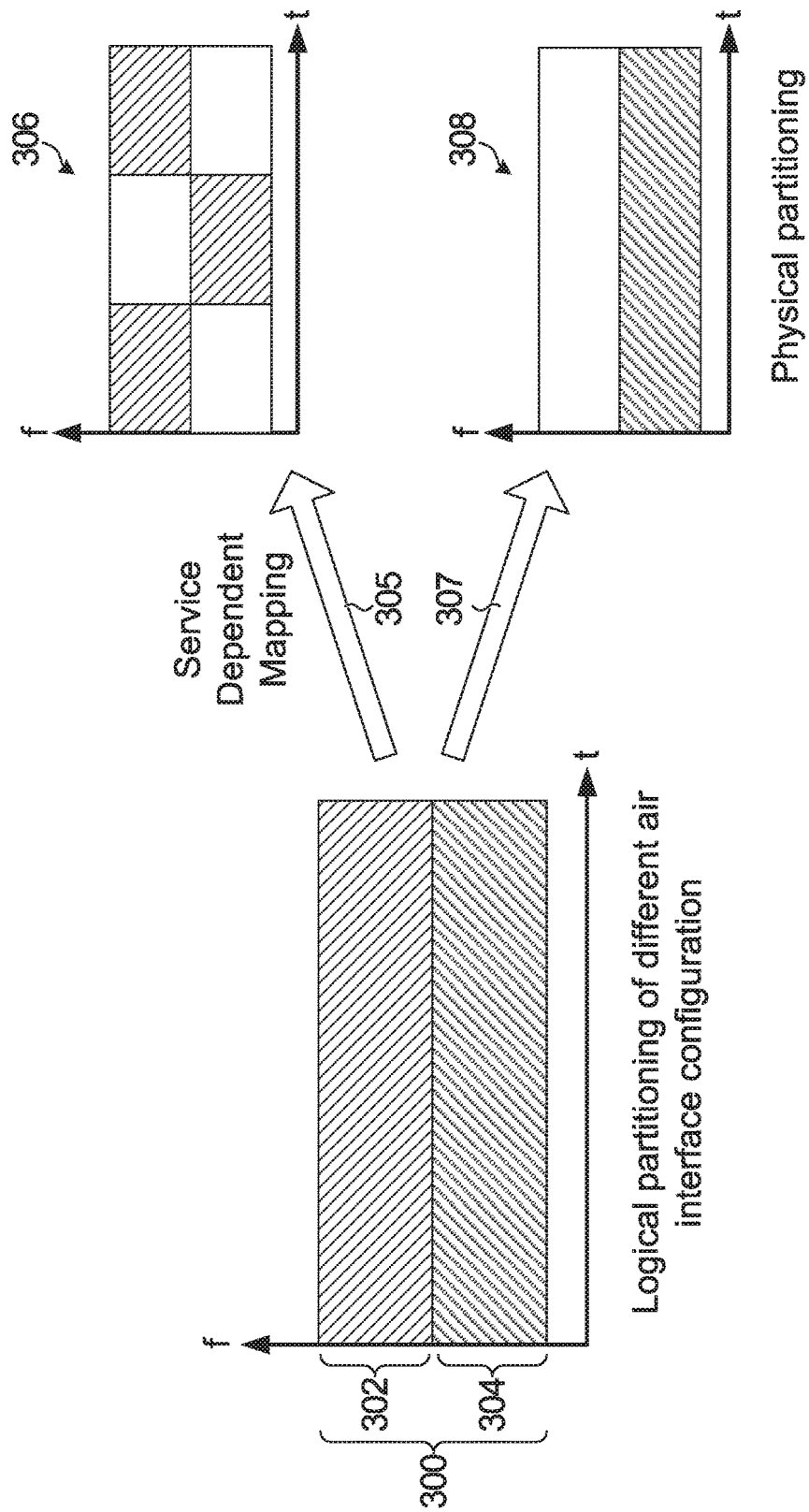
FIG. 3A is an example of logical partitioning and service dependent mapping.
Figure 3B:
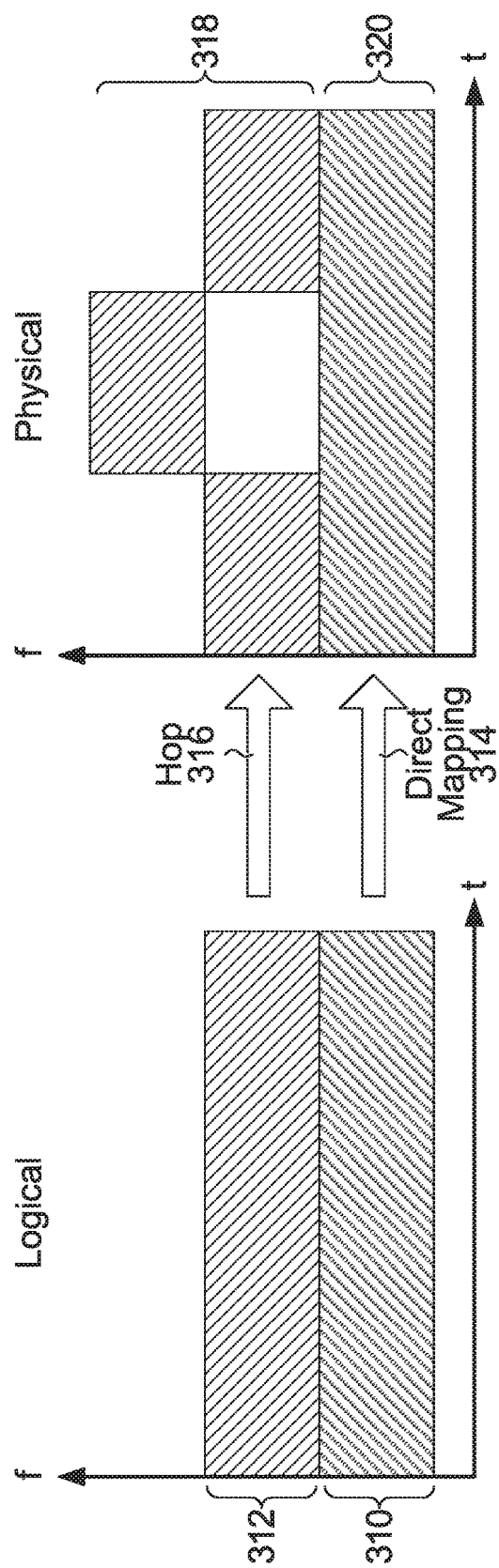
FIG. 3B is another example of logical partitioning and service dependent mapping.

An example is depicted in FIG. 3A, where a logical partitioning for two service slices is depicted at 300. The frequency axis of the left side of FIG. 3 represents a logical frequency resources. A partition 302 is allocated for a first service slice, and a partition 304 is allocated for a second service slice. A service dependent mapping is employed, such that the partition 302 is mapped at 305 to resources 306 using a hopping pattern, and partition 304 is mapped at 307 directly to a confined sub-band 308. It is noted that the two mappings 305,307 depict two different mapping options for mapping a block of logical frequency to physical resources. Another example is depicted in FIG. 3B which shows a combination of direct mapping 314 for a sub-band 310 to physical resource 320, and a mapping 314 using a hopping pattern for a sub-band 312 to a physical resource 320.

Figure 4:
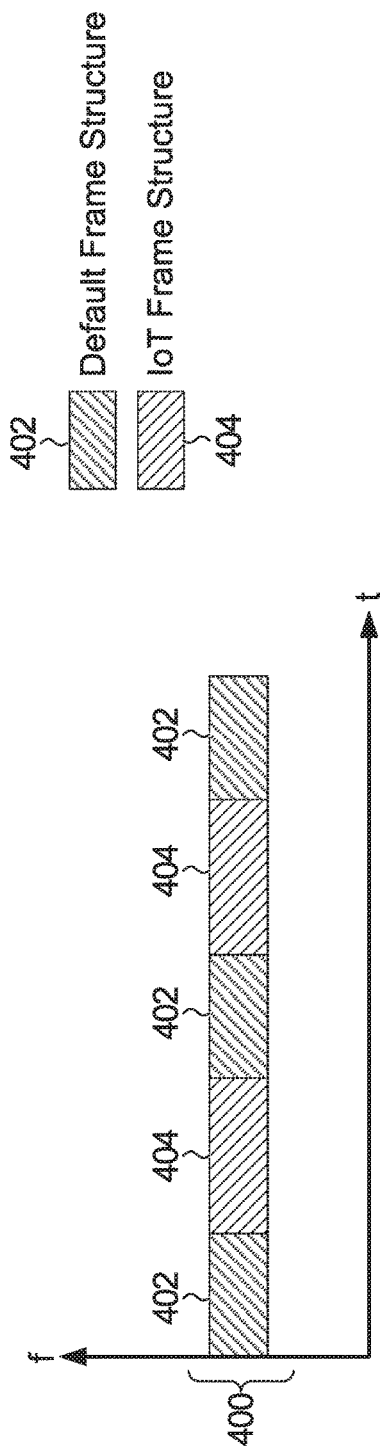
FIG. 4 is an example of coexistence of a default frame structure and MTC frame structure within a narrow sub-band.

Another example is depicted in FIG. 4 which shows a default frame structure defined within a sub-band 400 of an overall system bandwidth. In this example, a frame structure 404 for MTC occurs within the same sub-band as the default frame structure 402 in a time division multiplexed (TDM) fashion. Advantageously, with such a structure, an MTC device can perform initial access using the default frame structure, and perform on-going communications with the MTC frame structure, and only needs to monitor one sub-band. This allows lower-cost MTC devices to be built that do not need the capability of hopping between sub-bands.

Figure 5:
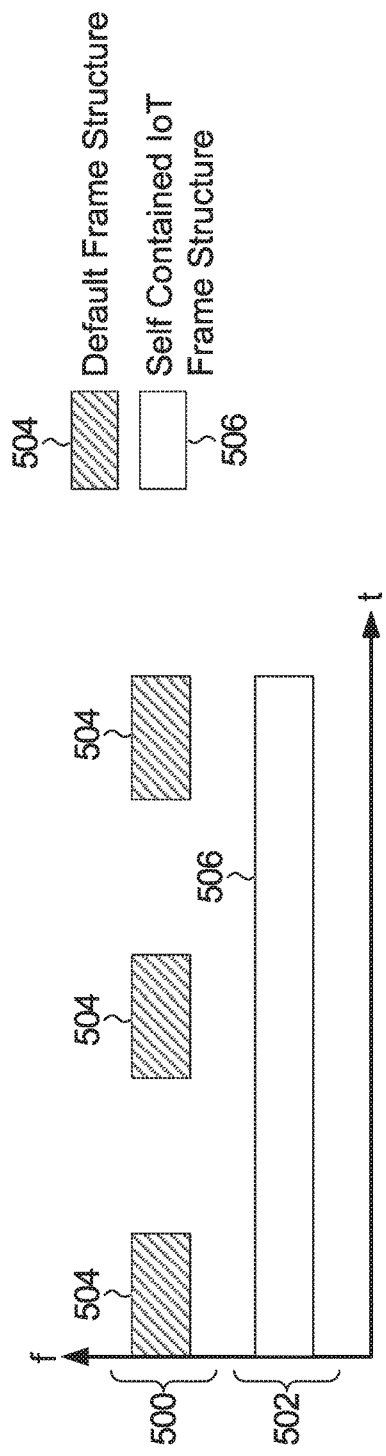
FIG. 5 is an example of a default frame structure and a nearby self-contained MTC frame structure.

Another example is depicted in FIG. 5. In this example, there is a first sub-band 500 containing a pre-defined default frame structure 504. There is a second sub-band 502 which is a self-contained frame structure 506 for MTC, and containing, for example, MTC sync and broadcast channel configured for MTC. In operation, a UE tunes to the pre-defined default frame structure 504 for initial synchronization and system information of MTC configurations (e.g. the sub-band for machine type services). This is only for initial access to the system or a change in the MTC sub-band location. In this example, the two sub-bands 500,502 are collectively confined to a physical bandwidth (not shown) such that the UE does not need to support a large bandwidth.

In subsequent network entry, a UE immediately performs initial access in the MTC sub-band 502. MTC synchronization and related system information is carried in the sub-band for machine type services, and as such, sub-band 502 is self-contained for MTC operation.

In embodiments in which it is desirable to minimize the reception capabilities of an MTC device, the self-contained MTC frame structure is located close to the default frame structure in frequency.

In an example method of MTC UE initial access, a MTC UE searches potential carrier frequencies (Radio Frequency (RF) channels) in the supported bands. Each carrier frequency may, for example, be identified by an E-UTRA Absolute Radio Frequency Channel Number (EARFCN). The number of carrier frequencies of each band maybe a reduced set from a full set in a spectrum band. For each potential carrier frequency, the MTC UE tries to acquire synchronization by detecting the synchronization channel. In some embodiments, an MTC UE tries a MTC-specific sync channel and a regular sync channel.

Figure 6A:
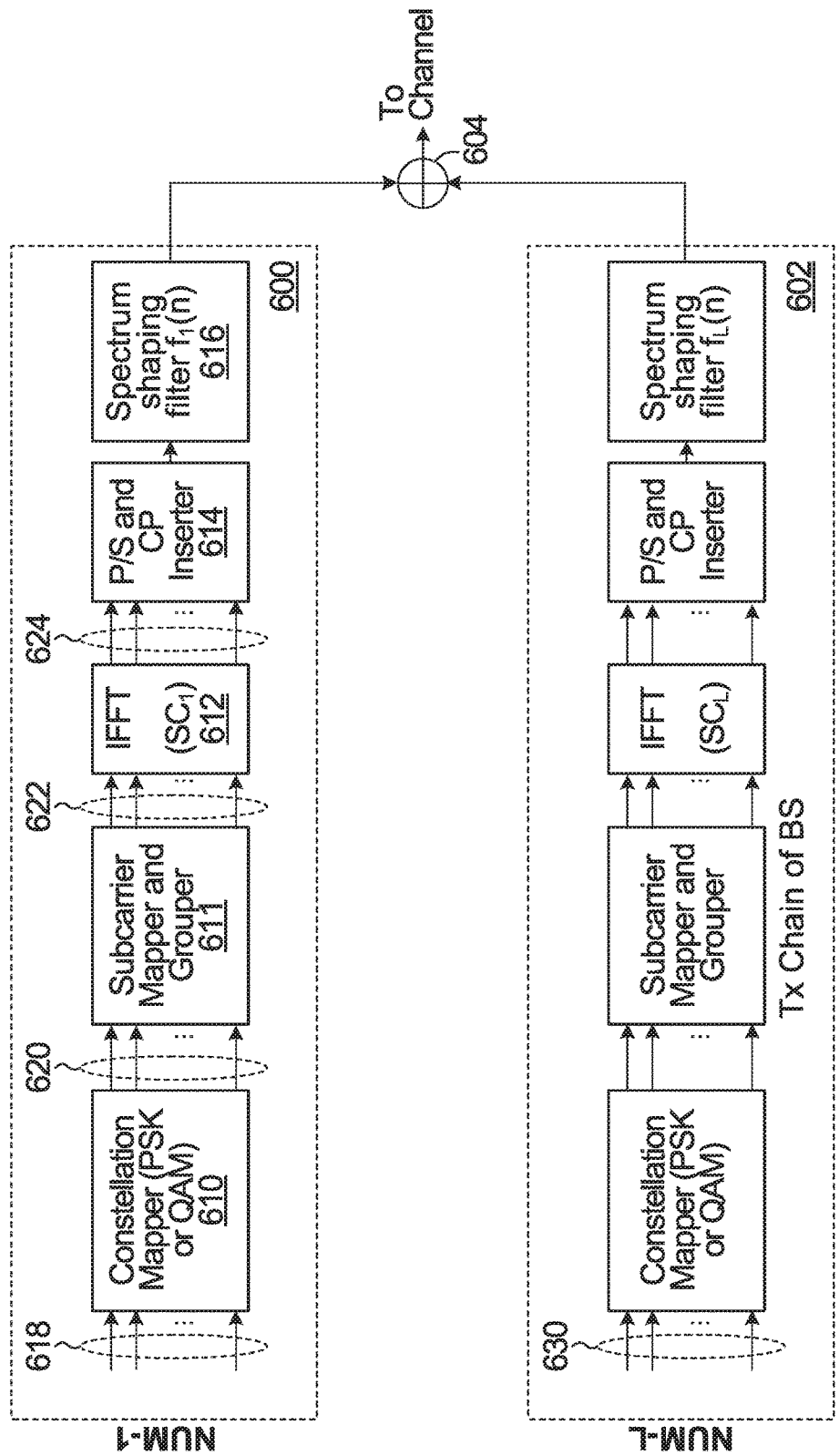
FIG. 6A is a block diagram of a transmitter for transmitting multiple service slices.

Referring now to FIG. 6A, shown is an example simplified block diagram of part of a transmitter that can be used to transmit channels for one or more services in a self-contained manner. In this example, there are L services, each with a respective numerology, where L>=2, but more generally, it is not necessary that a different numerology be used for each service.

Figure 6B:
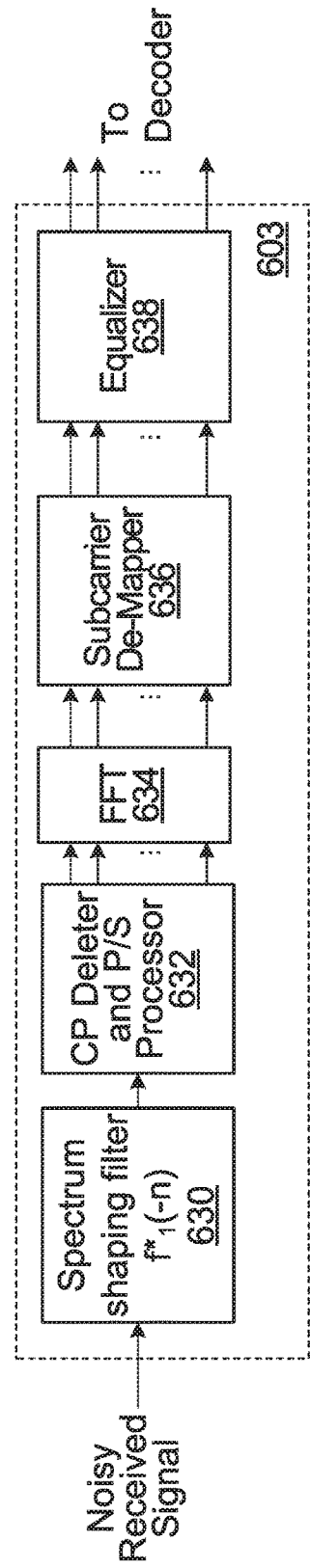
FIG. 6B is a block diagram of a receiver for receiving a service slice.

For each service, there is a respective transmit chain 600,602. FIG. 6A shows simplified functionality for the first and Lth numerology; the functionality for other numerologies would be similar. In the case where transmissions for the different services are from differing network elements, transmit chain 600 would be in a first network element and transmit chain 602 would be in a second network element. Also shown in FIG. 6B is simplified functionality for a receive chain 603 for a receiver operating using the first numerology.

The transmit chain 600 for the first numerology includes a constellation mapper 610, subcarrier mapper and grouper 611, IFFT 612 with subcarrier spacing $SC_1$, pilot symbol (P/S) and cyclic prefix inserter 614, and spectrum shaping filter 616. In operation, constellation mapper 610 receives user content containing data and/or signalling 618 for $K_1$ UEs, where $K_1>=1$. In the case of self-contained data and signaling in a sub-band, the signaling information including initial access information for a service is included as part of user content 618. In the case of initial access being performed within a first logical frequency resource, and ongoing communications being performed within a second logical resource, user content 618 for transmit chain 600 will contain the signaling information for initial access, and user content for another transmit chain (e.g. user content 630 for transmit chain 602) contains content for ongoing communications.

The constellation mapper 610 maps data and signalling information for the first service to a respective stream of constellation symbols and outputs the streams of constellation symbols 620. The number of bits per symbol depends on the particular constellation employed by the constellation mapper 610. In the example of 4-quadrature amplitude modulation (4-QAM), 2 bits from for each user are mapped to a respective QAM symbol.

For each OFDM symbol period, the subcarrier mapper and grouper 611 groups and maps the constellation symbols produced by the constellation mapper 610 to up to P inputs of the IFFT 612 at 622. The grouping and mapping is performed based on scheduler information, which in turn is based on channelization and resource block assignment, in accordance with a defined resource block definition and allocation for the content of the $K_1$ UEs being processed in transmit chain 600. P is the size of the IFFT 612. Not all of the P inputs are necessarily used for each OFDM symbol period. The IFFT 612 receives up to P symbols, and outputs P time domain samples at 624. Following this, in some implementations, time domain pilot symbols are inserted and a cyclic prefix is added in block 614. The spectrum shaping filter 616 applies a filter $f_1(n)$ which limits the spectrum at the output of the transmit chain 600 to mitigate interference with the outputs of other transmit chains such as transmit chain 602. The spectrum shaping filter 616 also performs shifting of each sub-band to its assigned frequency location.

The functionality of the other transmit chains, such as transmit chain 602, is similar. The outputs of all of the transmit chains are combined in a combiner 604 before transmission on the channel.

FIG. 6B shows a simplified block diagram of a receive chain for a UE operating with the first numerology depicted at 603. In some embodiments, a given user equipment supports only one service (e.g. MTC) and is permanently configured to operate with a particular numerology. In some embodiments, a given UE operates with a configurable numerology. The receive chain 603 includes spectrum shaping filter 630, cyclic prefix deleter and pilot symbol processor 632, fast Fourier transform (FFT) 634, subcarrier de-mapper 636 and equalizer 638. Each element in the receive chain performs corresponding reverse operations to those performed in the transmit chain. The receive chain for a UE operating with another numerology would be similar.

In some embodiments, a system bandwidth is configured with a respective sub-band for each service, and at least one sub-band is reserved for future use. A self-contained set of signaling and data channels can be defined within the reserved sub-band completely independently of the existing sub-bands, and without interfering with the existing sub-bands. This provides a measure of future proofing.

In some embodiments, as described above, multiple different numerologies are used. These may differ across sub-bands, with a different numerology being used for each service slice. In some embodiments, multiple numerologies are used for one service. Frame structures have been proposed that are flexible in terms of the use of differing numerologies. A numerology is defined in terms of subcarrier spacing and of OFDM symbol duration, and may also be defined by other parameters such as inverse fast Fourier transform (IFFT) length, transmit time interval (TTI) length, and cyclic prefix (CP) length or duration. These numerologies may be scalable in the sense that subcarrier spacings are multiples of each other as between the differing numerologies, and TTI lengths are also multiples of each other as between differing numerologies. Such a scalable design across multiple numerologies provides implementation benefits, for example scalable total OFDM symbol duration in a time division duplex (TDD) context. See also Applicant's U.S. provisional application No. 62/169,342 to Liqing Zhang et al., entitled "System and Scheme of Scalable OFDM Numerology", hereby incorporated by reference in its entirety, which provides systems and methods with scalable numerologies.

Table 1 below contains an example of a flexible frame structure design with scalable numerologies in the four columns under "Frame structure". Frames can be built using one or a combination of the four scalable numerologies. For comparison purposes, in the right hand column of the table, the conventional fixed LTE numerology is shown. In Table 1, each numerology uses a first cyclic prefix length for a first number of OFDM symbols, and a second cyclic prefix length for a second number of OFDM symbols. For example, in the first column under "Frame structure", the TTI includes 3 symbols with a cyclic prefix length of 1.04 us followed by 4 symbols with a cyclic prefix length of 1.3 us.

The first column is for a numerology with 60 kHz subcarrier spacing which also has the shortest OFDM symbol duration. This may be suitable for ultra-low latency communications, such as Vehicle-to-Any (V2X) communications, and more generally any industrial control application. The second column is for a numerology with 30 kHz subcarrier spacing. The third column is for a numerology with 15 kHz subcarrier spacing. This numerology has the same configuration as in LTE, except that there are only 7 symbols in a TTI. This may be suitable for broadband services. The fourth column is for a numerology with 7.5 kHz spacing, which also has the longest OFDM symbol duration among the four numerologies. This may be useful for coverage enhancement and broadcasting. Of the four numerologies listed, those with 30 kHz and 60 kHz subcarrier spacings are more robust to Doppler spreading (fast moving conditions), because of the wider subcarrier spacing.

TABLE 1

Example set of Numerologies

| Parameters | Frame structure | | | | Baseline (LTE) |
|---|---|---|---|---|---|
| TTI Length | 0.125 ms | 0.25 ms | 0.5 ms | 1 ms | TTI = 1 ms |
| Subcarrier spacing | 60 kHz | 30 kHz | 15 kHz | 7.5 kHz | 15 kHz |
| FFT size | 512 | 1024 | 2048 | 4096 | 2048 |
| Symbol duration | 16.67 us | 33.33 us | 66.67 us | 133.33 us | 66.67 us |

TABLE 1-continued

Example set of Numerologies

| Parameters | Frame structure | | | | Baseline (LTE) |
|---|---|---|---|---|---|
| #symbols in each TTI | 7 (3,4) | 7 (3,4) | 7 (3,4) | 7 (3,4) | 14 (2,12) |
| CP length | 1.04 us, 1.30 us (32,40 point) | 2.08 us, 2.60 us (64,80 point) | 4.17 us, 5.21 us (128,160 point) | 8.33 us, 10.42 us (256,320 point) | 5.2 us, 4.7 us (160,144 point) |
| CP overhead | 6.67% | 6.67% | 6.67% | 6.67% | 6.67% |
| BW (MHz) | 20 | 20 | 20 | 20 | 20 |

It should be understood that the specific numerologies of the example of Table 1 are for illustration purposes, and that a flexible frame structure combining other numerologies can alternatively be employed.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple UEs. In a specific example, filtered OFDM (f-OFDM) can be employed. With f-OFDM, filtering is employed to shape the spectrum of each sub-band OFDM signal, and the sub-band OFDM signals are then combined for transmission. f-OFDM lowers out-of-band emission and improves transmission, and addresses the non-orthogonality introduced as a result of the use of different subcarrier spacings.

In some embodiments, the resource block definitions are configurable. For example, the number of tones per resource block can be varied across time and/or system bandwidth. See for example Applicant's co-pending U.S. application Ser. No. 14/952,983 filed Nov. 26, 2015, and entitled "Resource Block Channelization for OFDM-based Numerologies", hereby incorporated by reference in its entirety.

Numerous modifications and variations of the present disclosure are possible in light of the above teachings. It is therefore to be understood that within the scope of the appended claims, the disclosure may be practiced otherwise than as specifically described herein.

We claim:

1. A method comprising:
by a transmitter, transmitting, in a first logical frequency resource having a first frame structure, first data and first signaling information associated with the first data, the first signaling information including initial access information for communications in the first logical frequency resource; and
by the transmitter, transmitting, in a second logical frequency resource having a second frame structure different from the first frame structure, second signaling information associated with second data;
wherein the first logical frequency resource is a first logical frequency sub-band, and the second logical frequency resource is a second logical frequency sub-band;
wherein the first logical frequency resource is further subdivided into a primary logical frequency resource used for initial access and a secondary logical frequency resource, the method further comprising:
during initial access, transmitting an instruction of whether to use the primary logical frequency resource or the secondary logical frequency resource for communications pertaining to the first service other than initial access.

2. The method of claim 1 wherein transmissions on the first logical frequency resource use a physical resource with a first sub-carrier spacing, and transmissions on the second logical frequency resource use a physical resource with a second sub-carrier spacing that is different from the first sub-carrier spacing.

3. The method of claim 1 further comprising:
by the transmitter, transmitting, in the second logical frequency resource, the second data and said second signaling information associated with second data, the second signaling information including initial access information associated with the second data.

4. The method of claim 1 wherein the initial access information comprises broadcast, and a synchronization channel.

5. The method of claim 1 wherein the first signaling information comprises random access signaling.

6. The method of claim 3 wherein the transmissions on the first logical frequency resource are for a first machine-type communications (MTC) channel, and the transmissions on the second logical frequency resource are for a second MTC channel.

7. The method of claim 1 wherein the transmissions on the first logical frequency resource are in respect of a first service and the transmissions on the second logical frequency resource are in respect of a second service;
the method further comprising:
for the first service, mapping the first logical frequency resource to a first physical frequency resource;
for the second service, mapping the second logical frequency resource to a second physical frequency resource;
wherein at least one of the mappings is performed in a service specific manner.

8. The method of claim 7 wherein transmissions on the first physical resource use a first sub-carrier spacing, and transmissions on the second physical resource use a second sub-carrier spacing that is different from the first sub-carrier spacing.

9. The method of claim 7 wherein the first service is machine type communication (MTC), and wherein mapping the first logical resource to a first physical frequency resource comprises performing a direct mapping.

10. The method of claim 1 further comprising using a respective hypercell identifier for each logical frequency resource.

11. The method of claim 1 further comprising:
performing a logical to physical frequency resource mapping of air interface configurations in a manner that is configurable based on service and device capabilities.

12. The method of claim 1 wherein:
the first frame structure is a machine type communication (MTC) frame structure.

13. The method of claim 12 wherein at least one channel within the MTC frame structure has a different periodicity than a corresponding channel within the second frame structure.

14. The method of claim 12 wherein:
the MTC frame structure comprises a first synchronization channel;
the second frame structure comprises a second synchronization channel; and
the first synchronization channel has a longer periodicity than the second synchronization channel.

15. The method of claim 12 wherein:
the MTC frame structure comprises a first broadcast channel;
the second frame structure comprises a second broadcast channel; and
the first broadcast channel has a longer periodicity than the second broadcast channel.

16. An apparatus comprising:
a first transmitter configured to transmit, in a first logical frequency resource having a first frame structure, first data and first signaling information associated with the first data, the first signaling information including initial access information associated with the first data; and
a second transmitter configured to transmit, in a second logical frequency resource having a second frame structure different from the first frame structure, second signaling information associated with second data;
wherein the first logical frequency resource is a first logical frequency sub-band, and the second logical frequency resource is a second logical frequency sub-band;
wherein the first logical frequency resource is further subdivided into a primary logical frequency resource used for initial access and a secondary logical frequency resource, the method further comprising:
during initial access, transmitting an instruction of whether to use the primary logical frequency resource or the secondary logical frequency resource for communications pertaining to the first service other than initial access.

17. The apparatus of claim 16 wherein the second transmitter is configured to transmit in the second logical frequency resource, the second data and said second signaling information associated with second data, the second signaling information including initial access information associated with the second data.

18. The apparatus of claim 16 wherein the first signaling information comprises broadcast, synchronization, and ACK/NACK signaling.

19. The apparatus of claim 16 wherein the first signaling information comprises random access signaling.

20. The apparatus of claim 17 wherein the transmissions on the first logical frequency resource are for a first machine-type communications (MTC) channel, and the transmissions on the second logical frequency resource are for a second MTC channel.

21. The apparatus of claim 16 further configured to use a respective hypercell identifier for each logical frequency resource.

22. The apparatus of claim 16 wherein:
the first frame structure is a machine type communication (MTC) frame structure.

23. The apparatus of claim 22 wherein at least one channel within the MTC frame structure has a different periodicity than a corresponding channel within the second frame structure.

24. The apparatus of claim 22 wherein:
the MTC frame structure comprises a first synchronization channel;
the second frame structure comprises a second synchronization channel; and
the first synchronization channel has a longer periodicity than the second synchronization channel.

25. The apparatus of claim 22 wherein:
the MTC frame structure comprises a first broadcast channel;
the second frame structure comprises a second broadcast channel; and
the first broadcast channel has a longer periodicity than the second broadcast channel.

26. An apparatus comprising:
a transmitter configured to provide a first service by transmitting, in a first logical frequency resource having a first frame structure, first data and first signaling information associated with the first data, the first signaling information including initial access information associated with the first data; and
the transmitter further configured to transmit, in a second logical frequency resource having a second frame structure different from the first frame structure, second signaling information associated with second data;
wherein the first logical frequency resource is a first logical frequency sub-band, and the second logical frequency resource is a second logical frequency sub-band;
wherein the first logical frequency resource is further subdivided into a primary logical frequency resource used for initial access and a secondary logical frequency resource, the method further comprising:
during initial access, transmitting an instruction of whether to use the primary logical frequency resource or the secondary logical frequency resource for communications pertaining to the first service other than initial access.

27. The apparatus of claim 26 wherein:
the first frame structure is a machine type communication (MTC) frame structure.

28. The apparatus of claim 27 wherein at least one channel within the MTC frame structure has a different periodicity than a corresponding channel within the second frame structure.

29. The apparatus of claim 27 wherein:
the MTC frame structure comprises a first synchronization channel;
the second frame structure comprises a second synchronization channel; and
the first synchronization channel has a longer periodicity than the second synchronization channel.

30. The apparatus of claim 27 wherein:
the MTC frame structure comprises a first broadcast channel;
the second frame structure comprises a second broadcast channel; and
the first broadcast channel has a longer periodicity than the second broadcast channel.

\* \* \* \* \*